US005699482A

United States Patent [19]

Adoul et al.

[11] Patent Number: 5,699,482

[45] Date of Patent: Dec. 16, 1997

[54] FAST SPARSE-ALGEBRAIC-CODEBOOK SEARCH FOR EFFICIENT SPEECH CODING

[75] Inventors: Jean-Pierre Adoul; Claude Laflamme, both of Sherbrooke, Canada

[73] Assignee: Universite de Sherbrooke, Sherbrooke, Canada

[21] Appl. No.: 438,703

[22] Filed: May 11, 1995

Related U.S. Application Data

[63] Continuation of Ser. No. 927,528, Sep. 10, 1992, Pat. No. 5,444,816.

[30] Foreign Application Priority Data

Feb. 23, 1990 [CA] Canada .................................. 2010830

[51] Int. Cl.[6] ........................................ G01L 3/02

[52] U.S. Cl. .................................. 395/2.28; 395/2.32

[58] Field of Search .............................. 395/2.28, 2, 2.71, 395/2.1, 2.09, 2.32, 2.31, 2.62; 381/41

[56] References Cited

U.S. PATENT DOCUMENTS

| | | | |
|---|---|---|---|
| 4,401,855 | 8/1983 | Broderson et al. | 179/15.55 |
| 4,486,899 | 12/1984 | Fushikida | 381/36 |
| 4,520,499 | 5/1985 | Montlick et al. | 381/36 |
| 4,594,687 | 6/1986 | Kaneko et al. | 364/900 |
| 4,625,286 | 11/1986 | Papamichalis et al. | 364/513.5 |
| 4,667,340 | 5/1987 | Arjmand et al. | 381/31 |
| 4,677,671 | 6/1987 | Galand et al. | 381/31 |
| 4,680,797 | 7/1987 | Benke | 381/41 |
| 4,710,959 | 12/1987 | Feldman et al. | 381/36 |
| 4,720,861 | 1/1988 | Bertrand | 381/36 |
| 4,724,535 | 2/1988 | Ono | 375/122 |
| 4,742,550 | 5/1988 | Fette | 381/36 |
| 4,764,963 | 8/1988 | Atal | 381/36 |
| 4,771,465 | 9/1988 | Bronson et al. | 381/36 |
| 4,797,925 | 1/1989 | Lin | 381/36 |
| 4,797,926 | 1/1989 | Bronson et al. | 381/36 |
| 4,799,261 | 1/1989 | Lin et al. | 381/36 |
| 4,811,398 | 3/1989 | Copperi et al. | 381/37 |
| 4,815,134 | 3/1989 | Picone et al. | 381/31 |
| 4,817,157 | 3/1989 | Gerson | 381/40 |
| 4,821,324 | 4/1989 | Ozawa et al. | 381/31 |
| 4,858,115 | 8/1989 | Rusterholz et al. | 364/200 |
| 4,860,355 | 8/1989 | Copperi | 381/36 |
| 4,864,620 | 9/1989 | Bialick | 381/34 |
| 4,868,867 | 9/1989 | Davidson et al. | 381/36 |
| 4,873,723 | 10/1989 | Shibagaki et al. | 381/34 |

FOREIGN PATENT DOCUMENTS

| | | | |
|---|---|---|---|
| 0 138 061 A1 | 4/1985 | European Pat. Off. | G10L 7/08 |
| 0 514 912 A3 | 11/1992 | European Pat. Off. | G10L 9/18 |
| 0 532 225 A2 | 3/1993 | European Pat. Off. | G10L 5/00 |
| WO 91/13432 | 9/1991 | WIPO | G10L 9/14 |

OTHER PUBLICATIONS

On reducing computational complexity of codebook search in CELP coder through the use of algebraic codes; Laflamme et al., International Conference on acoustics speech and signal processing, (ICASSP 90) pp. 290 vol. 5, Apr. 1990.

Multipulse Excitation Codebook Design and Fast Search Methods for Celp Speech Coding IEEE Global Telecom. F.F. Tzeng—Conference & Exhibit. Hollywood, Fla. Nov. 28–Dec. 1, 1988 pp. 590–594.

(List continued on next page.)

*Primary Examiner*—Allen R. MacDonald
*Assistant Examiner*—Richemond Dorvil
*Attorney, Agent, or Firm*—Merchant, Gould, Smith, Edell, Welter & Schmidt, P.A.

[57] ABSTRACT

A method of encoding a speech signal is provided. This method improves the excitation codebook and search procedure of the conventional Code-Excited Linear Prediction (CELP) speech encoders. This code is based on a sparse algebraic code consisting in particular, but not exclusively, of interleaving N single-pulse permutation codes. The search complexity in finding the best codeword is greatly reduced by bringing the search back to the algebraic code domain thereby allowing the sparsity of the algebraic code to speed up the necessary computations. More precisely, the sparsity of the code enable the use of a very fast procedure based on N-embedded computation loops.

18 Claims, 4 Drawing Sheets

OTHER PUBLICATIONS

A comparison of some algebraic structures for CELP coding of speech J–P Adoul & C.Lamblin Proceedings ICASSP 1987 Intr'l Conf. Apr. 6–9, 1987 Dallas Texas pp. 1953–1956.

A robust 16 KBits/s Vector Adaptive Predictive Coder for Mobile Communication A.LeGuyader et al. Proceedings ICASSP 1986 Intr'l Conf. Apr. 7–11, 1986 Tokyo, Japan pp. 057–060.

Fast CELP coding based on algebraic codes J.P. Adoul et al. Proceedings ICASSP 1987 Intr'l Conf. Apr. 6–9 1987, Dallas, Texas pp. 1957–1960.

"Fast CELP Coding Based on the Barnes–Wall Lattice in 16 Dimensions", Lamblin et al., , IEEE, 1989, pp. 61–64.

"8 kbits/s Speech Coder with Pitch Adaptive Vector Quantizer" S. IAI and K. IRIE, ICASSP 1986, Tokyo, vol. 3, Apr. 1986, pp. 1697–1700.

"Fast Methods for Code Search in CELP" M.E. Ahmed and M. I. Al–Suwaiyel, IEEE Transactions on Speech and Audio Processing, 1993, vol. 1, No. 3, New York, pp. 315–325.

"Algorithme de quantification vectorielle sphérique á partir du réseau de Gosset d'ordre 8" C. Lamblin et J.P. Adoul, Annales des Télécommunications, 1988, vol. 43, No. 1–2, pp. 172–186.

FAST SPARSE-ALGEBRAIC-CODEBOOK SEARCH FOR EFFICIENT SPEECH CODING

This is a Continuation of U.S. patent application Ser. No. 07/927,528 filed on Sep. 10, 1992, U.S. Pat. No. 5,444,816, and entitled "Dynamic codebook for efficient speech coding based on algebraic codes".

BACKGROUND OF THE INVENTION

1. Field of the Invention

The present invention relates to a new technique for digitally encoding and decoding in particular but not exclusively speech signals in view of transmitting and synthesizing these speech signals.

2. Brief Description of the Prior Art

Efficient digital speech encoding techniques with good subjective quality/bit rate tradeoffs are increasingly in demand for numerous applications such as voice transmission over satellites, land mobile, digital radio or packed network, for voice storage, voice response and secure telephony.

One of the best prior art methods capable of achieving a good quality/bit rate tradeoff is the so called Code Excited Linear Prediction (CELP) technique. In accordance with this method, the speech signal is sampled and converted into successive blocks of a predetermined number of samples. Each block of samples is synthesized by filtering an appropriate innovation sequence from a codebook, scaled by a gain factor, through two filters having transfer functions varying in time. The first filter is a Long Term Predictor filter (LTP) modeling the pseudoperiodicity of speech, in particular due to pitch, while the second one is a Short Term Predictor filter (STP) modeling the spectral characteristics of the speech signal. The encoding procedure used to determine the parameters necessary to perform this synthesis is an analysis by synthesis technique. At the encoder end, the synthetic output is computed for all candidate innovation sequences from the codebook. The retained codeword is the one corresponding to the synthetic output which is closer to the original speech signal according to a perceptually weighted distortion measure.

The first proposed structured codebooks are called stochastic codebooks. They consist of an actual set of stored sequences of N random samples. More efficient stochastic codebooks propose derivation of a codeword by removing one or more elements from the beginning of the previous codeword and adding one or more new elements at the end thereof. More recently, stochastic codebooks based on linear combinations of a small set of stored basis vectors have greatly reduced the search complexity. Finally, some algebraic structures have also been proposed as excitation codebooks with efficient search procedures. However, the latter are designed for speed and they lack flexibility in constructing codebooks with good subjective quality characteristics.

OBJECTS OF THE INVENTION

The main object of the present invention is to combine an algebraic codebook and a filter with a transfer function varying in time, to produce a dynamic codebook offering both the speed and memory saving advantages of the above discussed structured codebooks while reducing the computation complexity of the Code Excited Linear Prediction (CELP) technique and enhancing the subjective quality of speech.

SUMMARY OF THE INVENTION

More specifically, in accordance with the present invention, there is provided a method of producing an excitation signal that can be used in synthesizing a sound signal, comprising the steps of generating a codeword signal in response to an index signal associated to this codeword signal, such signal generating step using an algebraic code to generate the codeword signal, and filtering the so generated codeword signal to produce the excitation signal.

Advantageously, the algebraic code is a sparse algebraic code.

The subject invention also relates to a dynamic codebook for producing an excitation signal that can be used in synthesizing a sound signal, comprising means for generating a codeword signal in response to an index signal associated to this codeword signal, which signal generating means using an algebraic code to generate the codeword signal, and means for filtering the so generated codeword signal to produce the excitation signal.

In accordance with a preferred embodiment of the dynamic codebook, the filtering means comprises a adaptive prefilter having a transfer function varying in time to shape the frequency characteristics of the excitation signal so as to damp frequencies perceptually annoying the human ear. This adaptive prefilter comprises an input supplied with linear predictive coding parameters representative of spectral characteristics of the the sound signal to vary the above mentioned transfer function.

In accordance with other aspects of the present invention, there is also provided:

(1) a method of selecting one particular algebraic codeword that can be processed to produce a signal excitation for a synthesis means capable of synthesizing a sound signal, comprising the steps of (a) whitening the sound signal to be synthesized to generate a residual signal, (b) computing a target signal X by processing a difference between the residual signal and a long term prediction component of the signal excitation, (c) backward filtering the target signal to calculate a value D of this target signal in the domain of an algebraic code, (d) calculating, for each codeword among a plurality of available algebraic codewords Ak expressed in the algebraic code, a target ratio which is function of the value D, the codeword Ak, and a transfer function H=D/X, and (e) selecting the said one particular codeword among the plurality of available algebraic codewords in function of the calculated target ratios.

(2) an encoder for selecting one particular algebraic codeword that can be processed to produce a signal excitation for a synthesis means capable of synthesizing a sound signal, comprising (a) means for whitening the sound signal to be synthesized and thereby generating a residual signal, (b) means for computing a target signal X by processing a difference between the residual signal and a long term prediction component of the signal excitation, (c) means for backward filtering the target signal to calculate a value D of this target signal in the domain of an algebraic code, (d) means for calculating, for each codeword among a plurality of available algebraic codewords Ak expressed in the above mentioned algebraic code, a target ratio which is function of the value D, the codeword Ak, and a transfer function H=D/X, and (e) means for selecting the said one particular codeword among the plurality of available algebraic codewords in function of the calculated target ratios. In accordance with preferred embodiments of the encoder, the target ratio comprises a numerator given by the expression $P^2(k)=(DAk^T)^2$ and a denominator given by the expression $\alpha^2k=\|AkH^T\|^2$, where Ak and H are under the form of matrix, each codeword Ak is a waveform comprising a small number of non-zero impulses each of which can occupy different positions in the waveform to thereby enable composition of different codewords, the target ratio calculating means comprises means for calculating into a plurality of embedded loops contributions of the non-zero impulses of the considered algebraic codeword to the numerator and denominator and for adding the so calculated contributions to previously calculated sum values of these numerator and denominator, respectively, the embedded loops comprise an inner loop, and the codeword selecting means comprises means for processing in the inner loop the calculated target ratios to determine an optimized target ratio and means for selecting the said one particular algebraic codeword in function of this optimized target ratio.

(3) a method of generating at least one long term prediction parameter related to a sound signal in view of encoding this sound signal, comprising the steps of (a) whitening the sound signal to generate a residual signal, (b) producing a long term prediction component of a signal excitation for a synthesis means component of a signal excitation for a synthesis means capable of synthesizing the sound signal, which producing step including estimating an unknown portion of the long term prediction component with the residual signal, and (c) calculating the long term prediction parameter in function of the so produced long term prediction component of the signal excitation.

(4) a device for generating at least one long term prediction parameter related to a sound signal in view of encoding this sound signal, comprising (a) means for whitening the sound signal and thereby generating a residual signal, (b) means for producing a long term prediction component of a signal excitation for a synthesis means capable of synthesizing the sound signal, these producing means including means for estimating an unknown portion of the long term prediction component with the residual signal, and (c) means for calculating the long term prediction parameter in function of the so produced long term prediction component of the signal excitation.

The objects, advantages and other features of the present invention will become more apparent upon reading of the following, non restrictive description of a preferred embodiment thereof, given with reference to the accompanying drawings.

DETAILED DESCRIPTION OF THE PREFERRED EMBODIMENT

Figure 1:
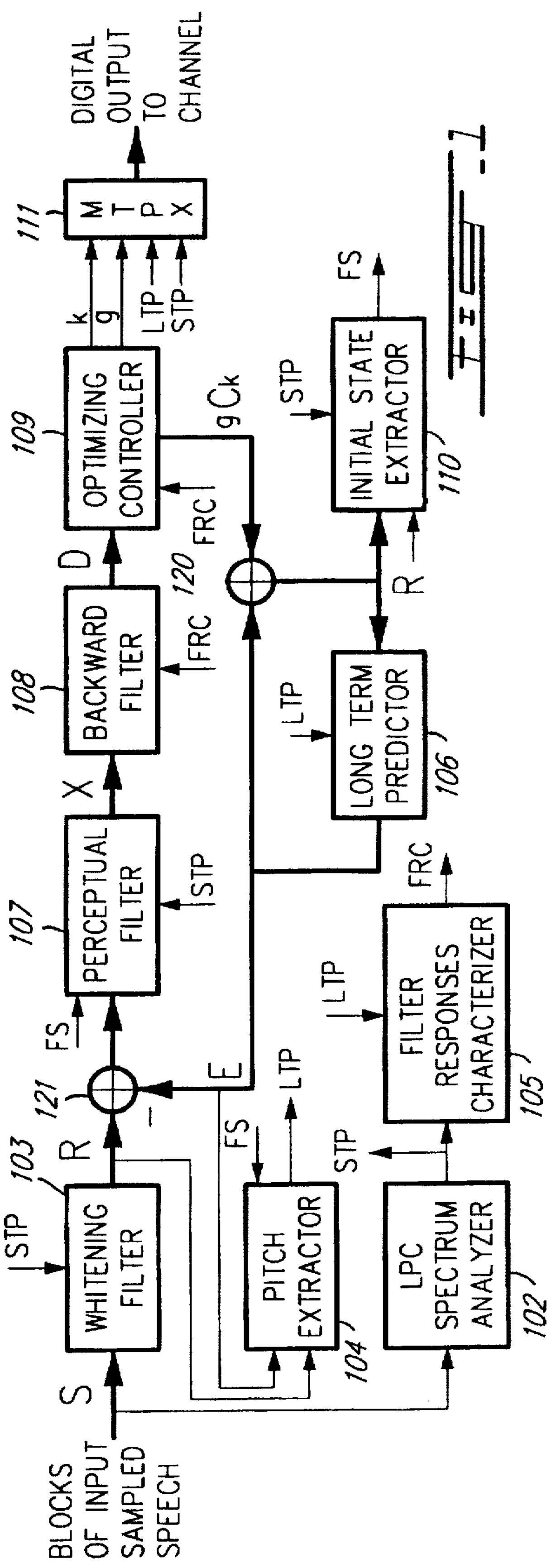
FIG. 1 is a schematic block diagram of the preferred embodiment of an encoding device in accordance with the present invention.
Figure 3:
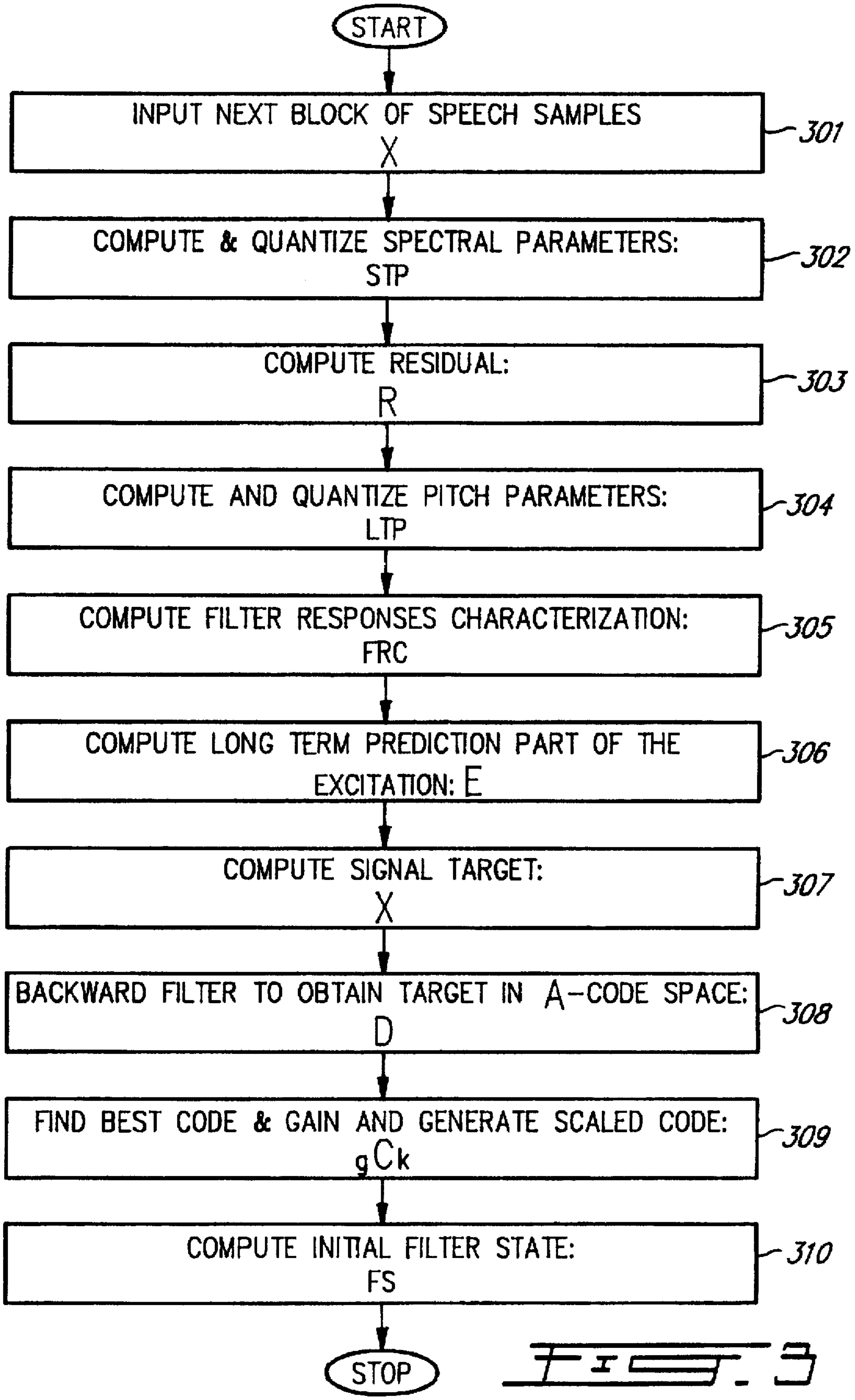
FIG. 3 is a flow chart showing the sequence of operations performed by the encoding device of FIG. 1.

FIG. 1 is the general block diagram of a speech encoding device in accordance with the present invention. Before being encoded by the device of FIG. 1, an analog input speech signal is filtered, typically in the band 200 to 3400 Hz and then sampled at the Nyquist rate (e.g. 8 kHz). The resulting signal comprises a train of samples of varying amplitudes represented by 12 to 16 bits of a digital code. The train of samples is divided into blocks which are each L samples long.. In the preferred embodiment of the present invention, L is equal to 60. Each block has therefore a duration of 7.5 ms. The sampled speech signal is encoded on a block by block basis by the encoding device of FIG. 1 which is broken down into 10 modules numbered from 102 to 111. The sequence of operation performed by these modules will be described in detail hereinafter with reference to the flow chart of FIG. 3 which presents numbered steps. For easy reference, a step number in FIG. 3 and the number of the corresponding module in FIG. 1 have the same last two digits. Bold letters refer to L-sample-long blocks (i.e. L-component vectors). For instance, S stands for the block [S(1), S(2), . . . S(L)].

Step 301

The next block S of L samples is supplied to the encoding device of FIG. 1.

Step 302

For each block of L samples of speech signal, a set of Linear Predictive Coding (LPC) parameters, called STP parameters, is produced in accordance with a prior art technique through an LPC spectrum analyser 102. More specifically, the latter analyser 102 models the spectral characteristics of each block S of samples. .In the preferred embodiment, the parameters STP comprise a number M=10 of prediction coefficients [a1, a2, . . . aM]. One can refer to the book by J. D. Markel & A. H. Gray, Jr: "Linear Prediction of Speech" Springer Verlag (1976) to obtain information on representative methods of generating these parameters.

Step 303

The input block S is whitened by a whitening filter 103 having the following transfer function based on the current values of the STP prediction parameters:

$$A(z)=\sum_{i=0}^{M} a_i z^{-i} \quad (1)$$

where $a_0=1$, and z represents the variable of the polynomial A(z).

As illustrated in FIG. 1, the filter 103 produces a residual signal R.

Of course, as the processing is performed on a block basis, unless otherwise stated, all the filters are assumed to store their final state for use as initial state in the following block processing.

The purpose of step 304 is to compute the speech periodicity characterized by the Long Term Prediction (LTP) parameters including a delay T and a pitch gain b.

Figure 2:
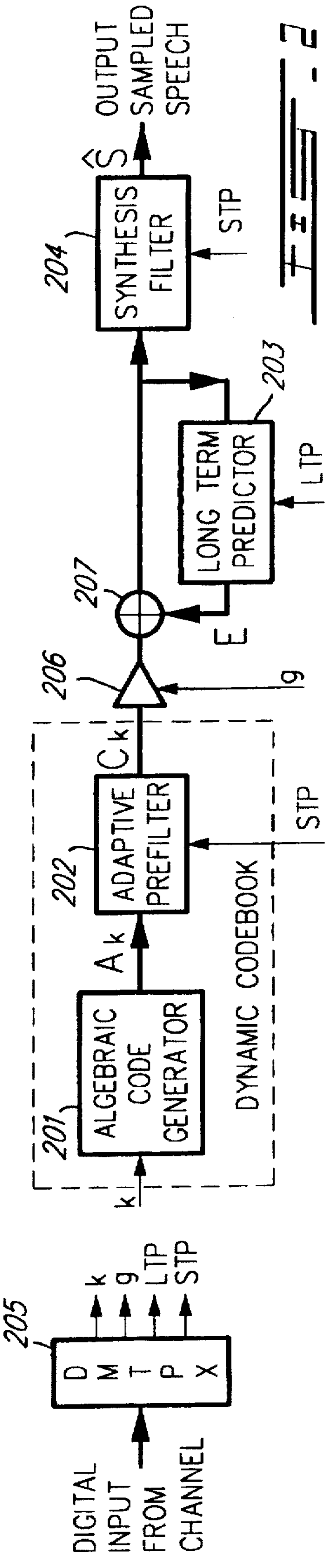
FIG. 2 is a schematic block diagram of a decoding device using a dynamic codebook in accordance with the present invention.

Before further describing step 304, it is Useful to explain the structure of the speech decoding device of FIG. 2 and understand the principle upon which speech is synthesized.

As shown in FIG. 2, a demultiplexer 205 interprets the binary information received from a digital input channel into four types of parameters, namely the parameters STP, LTP, k and g. The current block S of speech signal is synthetized on the basis of these four parameters as will be seen hereinafter.

The decoding device of FIG. 2 follows the classical structure of the CELP (Code Excited Linear Prediction) technique insofar as modules 201 and 202 are considered as a single entity: the (dynamic) codebook. The codebook is a virtual (i.e. not actually stored) collection of L-sample-long waveforms (codeword) indexed by an integer k. The index k ranges from 0 to NC−1 where NC is the size of the codebook. This Size is 4096 in the preferred embodiment. In the CELP technique, the output speech signal is obtained by first scaling the $k^{th}$ entry of the codebook by the pitch gain g through an amplifier 206. All adder 207 adds the so obtained scaled waveform, gCk, to the output E (the long term prediction component of the signal excitation of a synthesis filter 204) of a long term predictor 203 placed in a feedback loop and having a transfer function B(z) defined as follows:

$$B(z)=bz^{-T} \tag{2}$$

where b and T are the above defined pitch gain and delay, respectively.

The predictor 203 is a filter having a transfer function influenced by the last received LTP parameters b and T to model the pitch periodicity of speech. It introduces the appropriate pitch gain b and delay of T samples. The composite signal gCk+E constitutes the signal excitation of the snythesis filter 204 which has a transfer function 1/A(z). The filter 204 provides the correct spectrum shaping in accordance with the last received STP parameters. More specifically, the filter 204 models the resonant frequencies (formants) of speech. The output block Ŝ is the synthesized (sampled) speech signal which can be converted into an analog signal with proper anti-aliasing filtering in accordance with a technique well known in the art.

In the present invention, the codebook is dynamic; it is not stored but is generated by the two modules 201 and 202. In a first step, an algebraic code generator 201 produces in response to the index k and in accordance with a Sparse Algebraic Code (SAC) a codeword Ak formed of a L-sample-long waveform having very few non zero components. In fact, the generator 201 constitutes an inner, structured codebook of size NC. In a second step, the codeword Ak from the generator 201 is processed by a adaptive prefilter 202 whose transfer function F(z) varies in time in accordance with the STP parameters. The filter 202 colors, i.e. shapes the frequency characteristics (dynamically controls the frequency) of the output excitation signal Ck so as to damp a priori those frequencies perceptually more annoying to the human ear. The excitation signal Ck, sometimes called the innovation sequence, takes care of whatever part of the original speech signal left unaccounted by either the above defined formant and pitch modelling. In the preferred embodiment of the present invention, the transfer function F(z) is given by the following relationship:

$$F(z)=\frac{A(z\gamma_1^{-1})}{A(z\gamma_2^{-1})} \tag{3}$$

where $\gamma_1=0.7$ and $\gamma_2=0.85$.

There are many ways to design the generator 201. An advantageous method consists of interleaving four single-pulse permutation codes as follows. The codewords Ak are composed of four non zero pulses with fixed amplitudes, namely $S_1=1$, $S_2=-1$, $S_3=1$, and $S_4=-1$. The positions allowed for $S_i$ are of the form $p_i=2i+8m_i-1$, where $m_i=0, 1, 2, \ldots 7$. It should be noted that for $m_3=7$ (or $m_4=7$) the position $p_3$ (or $p_4$) falls beyond L=60. In such a case, the impulse is simply discarded. The index k is obtained in a straightforward manner using the following relationship:

$$k=512\,m_1+64\,m_2+8\,m_3+m_4 \tag{4}$$

The resulting Ak-codebook is accordingly composed of 4096 waveforms having only 2 to 4 non zero impulses.

Returning to the encoding procedure, it is useful to discuss briefly the criterion used to select the best excitation signal Ck. This signal must be chosen to minimize, in some ways, the difference Ŝ−S between the synthesized and original speech signals. In original CELP formulation,, the excitation signal Ck is based on a Mean Squared Error (MSE) criteria applied to the error Δ=Ŝ'−S', where Ŝ', respectively S', is Ŝ, respectively S, processed by a perceptual weighting filter of the form $A(z)/A(z\gamma^{-1})$ where $\gamma=0.8$ is the perceptual constant. In the present invention, the same criterion is used but the computations are performed in accordance with a backward filtering procedure which is now briefly recalled. One can refer to the article by J. P. Adoul, P. Mabilleau, M. Delprat,. & S. Morissette: "Fast CELP coding based on algebraic codes", Proc. IEEE Int'l conference on acoustics speech and signal processing, pp 1957–1960 (April 1987), for more details on this procedure. Backward filtering brings the search back to the Ck-space. The present invention brings the search further back to the Ak-space. This improvement together with the very efficient search method used by controller 109 (FIG. 1) and discussed hereinafter enables a tremendous reduction in computation complexity with regard to the conventional approaches.

It should be noted here that the combined transfer function of the filters 103 and 107 (FIG. 1) is precisely the same as that of the above mentioned perceptual weighting filter which transforms S into S', that is transforms S into the domain where the MSE criterion can be applied.

Step 304

Figure 4:
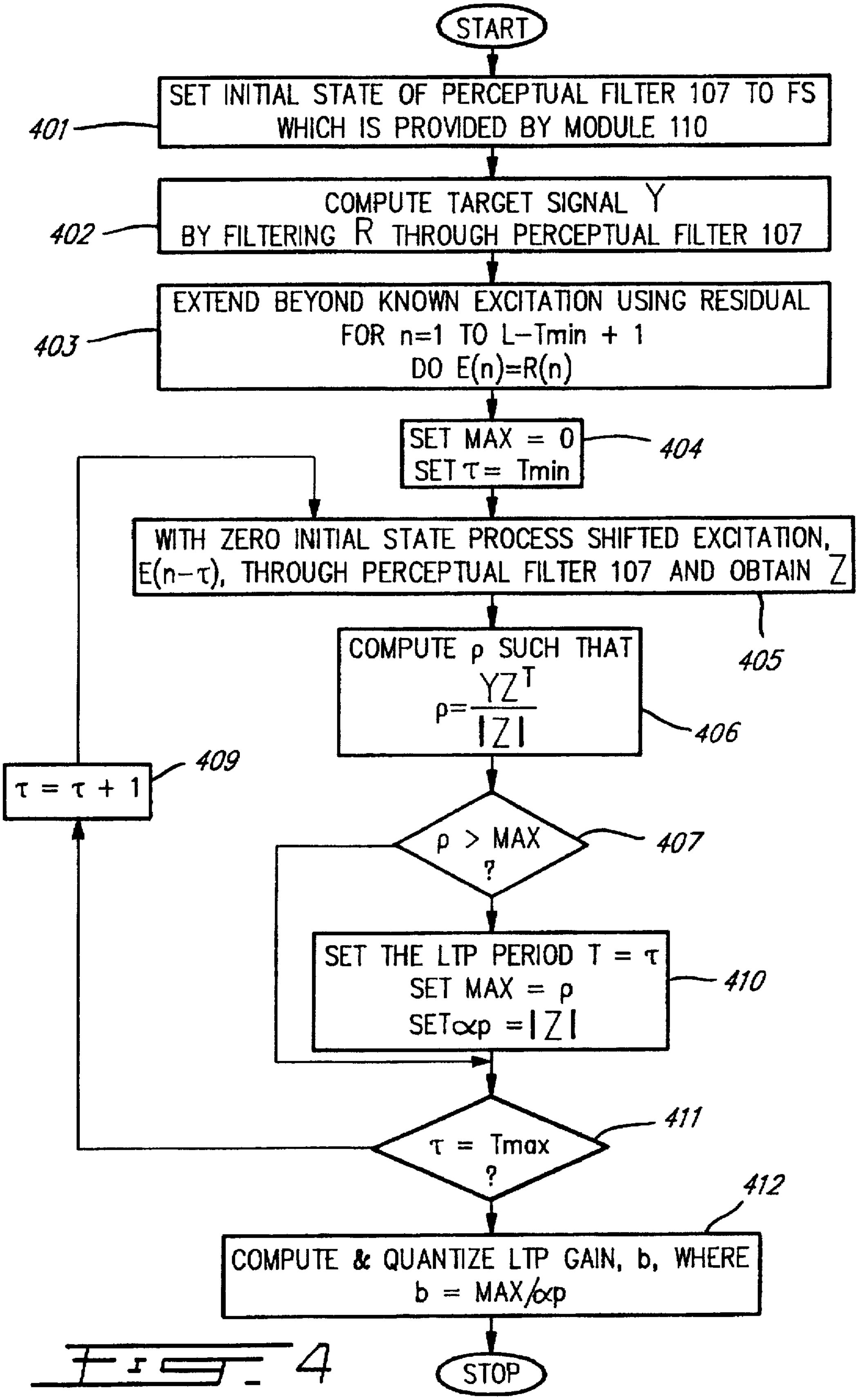
FIG. 4 is a flow chart showing the different operations carried out by a pitch extractor of the encoding device of FIG. 1, for extracting pitch parameters including a delay T and a pitch gain b.

To carry out this step, a pitch extractor 104 (FIG. 1) is used to compute and quantize the LTP parameters, namely the pitch delay T ranging from Tmin to Tmax (20 to 146 samples in the preferred embodiment) and the pitch gain g. Step 304 itself comprises a plurality of steps as illustrated in FIG. 4. Referring now to FIG. 4, a target signal Y is calculated by filtering (step 402) the residual signal R through the perceptual filter 107 with its initial state set (step 401) to the value FS available from an initial state extractor 110. The initial state of the extractor 104 is also set to the value FS as illustrated in FIG. 1. The long term prediction component of the signal excitation, E(n), is not known for the current values n=1, 2, . . . The values E(n) for n=1 to L-Tmin+1 are accordingly estimated using the residual signal R available from the filter 103 (step 403). More specifically, E(n) is made equal to R(n) for these values of n. In order to start the search for the best pitch delay T, two variables Max and τ are initialized to 0 and Tmin respectively (step 404). With the initial state set to zero (step 405), the long term prediction part of the signal excitation shifted by the value τ, E(n−τ), is processed by the perceptual filter 107 to obtain the signal Z. The crosscorrelation ρ between the signals Y and Z is then computed using the expression in block 406 of FIG. 4. If the crosscorrelation ρ is greater than the variable Max (step 407), the pitch delay T is updated to τ, the variable Max is updated to the value of the crosscorrelation ρ and the pitch energy term $\alpha_p$ equal to ||Z|| is stored (step 410). If τ is smaller than Tmax (step 411), it is incremented by one (step 409) and the search procedure continues. When τ reaches Tmax, the optimum pitch gain b is computed and quantized using the expression $b=Max/\alpha_p$ (step 412).

Step 305

In step 305, a filter responses characterizer 105 (FIG. 1) is supplied with the STP and LTP parameters to compute a filter responses characterization FRC for use in the later steps. The FRC information consists of the following three components where n=1, 2, . . . L. It should also be noted that the component f(n) includes the long term prediction loop.

$$\bullet f(n):\ \text{impulse response of } F(z)\frac{1}{1-bz^{-T}} \tag{5a}$$

$$\bullet h(n):\ \text{response of } \frac{1}{A(z\gamma^{-1})} \text{ to } f(n) \tag{5b}$$

with zero initial state. •u(i,j): autocorrelation of h(n); i.e.:

$$u(i,j)=\sum_{k=1}^{L} h(k-i+1)h(k-j+1);\ \text{for } 1\le i\le L \tag{5c}$$

$$\text{and } i\le j\le L;\ h(n)=0 \text{ for } n<1$$

The utility of the FRC information will become obvious upon discussion of the forthcoming steps.

Step 306

The long term predictor 106 is supplied with the signal excitation E+gCk to compute the component E of this excitation contributed by the long term prediction (parameters LTP) using the proper pitch delay T and gain b. The predictor 106 has the same transfer function as the long term predictor 203 of FIG. 2.

Step 307

In this step, the initial state of the perceptual filter 107 is set to the value FS supplied by the initial state extractor 110. The difference R–E calculated by a subtractor 121 (FIG. 1) is then supplied to the perceptual filter 107 to obtain at the output of the latter filter a target block signal X. As illustrated in FIG. 1, the STP parameters are applied to the filter 107 to vary its transfer function in relation to these parameters. Basically, X=S'–P where P represents the contribution of the long term prediction (LTP) including "ringing" from the past excitations. The MSE criterion which applies to Δ can now be stated in the following matrix notations.

$$\min_k |\Delta|^2 = \min_k |S'-\hat{S}|^2 = \min_k |S'-[P-gA_kH^T]|^2 \tag{6}$$

$$= \min_k |X-gA_kH^T|^2$$

where H accounts for the global filter transfer function $F(z)/(1-B(z))A(z\gamma^{-1})$. It is an L×L lower triangular Toeplitz matrix formed from the h(n) response.

Step 308

This is the backward filtering step performed by the filter 108 of FIG. 1. Setting to zero the derivative of the above equation (6) with respect to the code gain g yields to the optimum gain as follows:

$$\frac{\partial|\Delta|^2}{\partial g}=0 \tag{7}$$

$$g=\frac{X(A_kH^T)^T}{|A_kH^T|^2}$$

With this value for g the minimization becomes:

$$\min_k |\Delta|^2 = \min_k \left\{ |X|^2-\frac{(X(A_kH^T)^T)^2}{|A_kH^T|^2} \right\} \tag{8}$$

$$= \max_k \frac{(X(A_kH^T)^T)^2}{|A_kH^T|^2}$$

$$= \max_k \frac{((XH)A_k^T)^2}{\alpha_k^2} = \max_k \frac{(DA_k^T)^2}{\alpha_k^2}$$

-continued where $D=(XH)$ and $\alpha_k^2=|A_kH^T|^2$.

In step 308, the backward filtered target signal D=(XH) is computed. The term "backward filtering" for this operation comes from the interpretation of (XH) as the filtering of time-reversed X.

Step 309

In this step performed by the optimizing controller 109 of FIG. 1, equation (8) is optimized by computing the ratio $(DAk^T/\alpha k)^2=P^2k/\alpha^2k$ for each sparce algebraic codeword Ak. The denominator is given by the expression:

$$\alpha^2k=\|A_kH^T\|^2=A_kH^THA_k^T=A_kUA_k^T \tag{9}$$

where U is the Toeplitz matrix of the autocorrelations defined in equation (5c). Calling S(i) and p(i) respectively the amplitude and position of the ith non zero impulse (i=1, 2, . . . N), the numerator and (squared) denominator simplify to the following:

$$DA_k^T=\sum_{i=1}^{N} S(i)D(p_i) \tag{10a}$$

$$\alpha_k^2=\sum_{i=1}^{N} S^2(i)U(p_i,p_i)+2\sum_{i=1}^{N-1}\sum_{j=i+1}^{N} S(i)S(j)U(p_i,p_j) \tag{10b}$$

where P(N)–DAk$^T$

Figure 5:
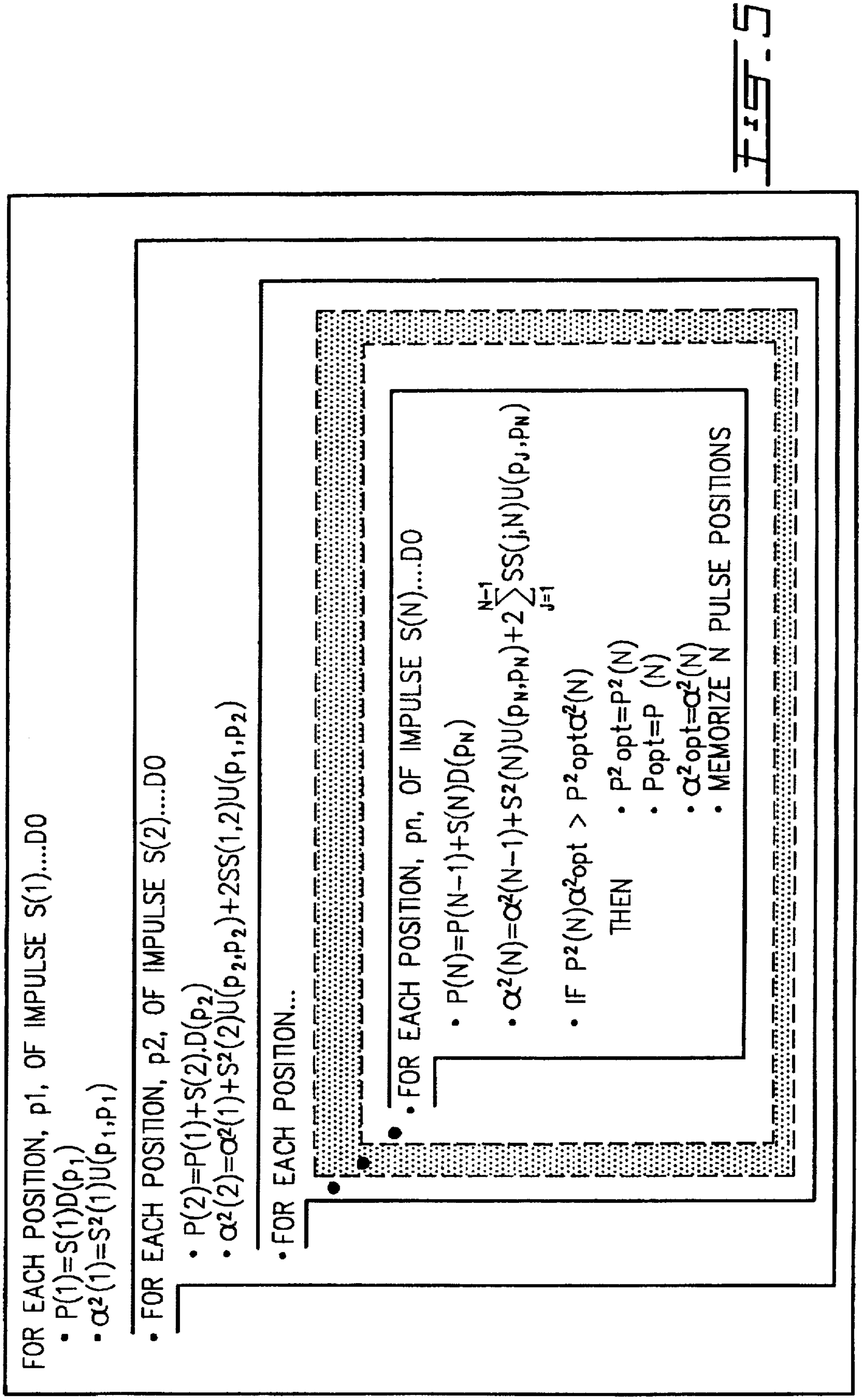
FIG. 5 is a schematic representation of a plurality of embedded loops used in the computation of optimum codewords and code gains by an optimizing controller of the encoding device of FIG. 1.

A very fast procedure for calculating the above defined ratio for each codeword Ak is described in FIG. 5 as a set of N embedded computation loops, N being the number of non zero impulses in the codewords. The quantities $S^2(i)$ and SS(i,j)=S(i)S(j), for i=1, 2, . . . N and i<j≦N are prestored for maximum speed. Prior to the computations, the values for $P^2_{opt}$ and $\alpha^2_{opt}$ are initialized to zero and some large number, respectively. As can be seen in FIG. 5, partial sums of the numerator and denominator are calculated in each one of the outer and inner loops, while in the inner loop the largest ratio $P^2(N)/\alpha^2(N)$ is retained as the ratio $P^2_{opt}/\alpha^2_{opt}$. The calculating procedure is believed to be otherwise self-explanatory from FIG. 5. When the N embedded loops are completed, the code gain is computed as $g=P_{opt}/\alpha^2_{opt}$ (cf equation (7)) The gain is then quantized, the index k is computed from stored impulse positions using the expression (4), and the L components of the scaled optimum code gCk are computed as follows:

$$gC_k(n)=g\sum_{i=1}^{N} S(i)f(n-p_i);\ 1\le n\le L \tag{11}$$

$$\text{with } f(n)=0;\ \text{for } n<1$$

Step 310

The global signal excitation signal E+gCk is computed by an adder 120 (FIG. 1). The initial state extractor module 110, constituted by a perceptual filter with a transfer function $1/A(z\gamma^{-1})$ varying in relation to the STP parameters, subtracts from the residual signal R the signal excitation signal E+gCk for the sole purpose of obtaining the final filter state FS for use as initial state in filter 107 and module 104.

Step 311

The set of four parameters STP, LTP, k and g are converted into the proper digital channel format by a multiplexer 111 completing the procedure for encoding a block S of samples of speech signal.

Accordingly, the present invention provides a fully quantized Algebraic Code Excited Linear Prediction (ACELP) vocoder giving near toll quality at rates ranging from 4 to 16 kbits. This is achieved through the use of the above described dynamic codebook and associated fast search algorithm.

The drastic complexity reduction that the present invention offers when compared to the prior art techniques comes from the fact that the search procedure can be brought back to Ak-code space by a modification of the so called backward filtering formulation. In this approach the search reduces to finding the index k for which the ratio $|DAk^T|/\alpha k$ is the largest. In this ratio, Ak is a fixed target signal and αk is an energy term the computation of which can be done with very few operations by codeword when N, the number of non zero components of the codeword Ak, is small.

Although a preferred embodiment of the present invention has been described in detail hereinabove, this embodiment can be modified at will, within the scope of the appended claims, without departing from the nature and spirit of the invention. As an example, many types of algebraic codes can be chosen to achieve the same goal of reducing the search complexity while many types of adaptive prefilters can be used. Also the invention is not limited to the treatment of a speech signal; other types of sound signal can be processed. Such modifications, which retain the basic principle of combining an algebraic code generator with a adaptive prefilter, are obviously within the scope of the subject invention.

The embodiments of the invention in which an exclusive property or privilege is claimed are defined as follows:

1. A method of calculating an index k for encoding a sound signal according to a Code-Excited Linear Prediction technique using a sparse algebraic code to generate an algebraic codeword in the form of an L-sample long waveform comprising a small number N of non-zero pulses each of which is assignable to different positions in the waveform to thereby enable composition of several of algebraic codewords $A_k$, said index calculating method comprising the steps of:

(a) calculating a target ratio $$(DA_k^T/\alpha_k)^2$$

for each algebraic codeword among a plurality of said algebraic codewords $A_k$;

(b) determining the largest ratio among said calculated target ratios; and (c) extracting the index k corresponding to the largest calculated target ratio;

wherein, because of the algebraic-code sparsity, the computation involved in said step of calculating a target ratio is reduced to the sum of only N and N(N+1)/2 terms for the numerator and denominator, respectively, namely $$DA_k^T = \sum_{i=1}^{N} S(i)D(p_i)$$

$$\alpha_k^2 = \sum_{i=1}^{N} S^2(i)U(p_i,p_i) + 2\sum_{i=1}^{N-1}\sum_{j=i+1}^{N} S(i)S(j)U(p_i,p_j)$$

where:

i=1, 2, . . . N;

S(i) is the amplitude of the $i^{th}$ non-zero pulse of the algebraic codeword $A_k$;

D is a backward-filtered version of an L-sample block of said sound signal;

$p_i$ is the position of the $i^{th}$ non-zero pulse of the algebraic codeword $A_k$;

$p_j$ is the position of the $j^{th}$ non-zero pulse of the algebraic codeword $A_k$; and U is a Toeplitz matrix of autocorrelation terms defined by the following equation:

$$U(i,j) = \sum_{m=1}^{L} h(m-i+1)h(m-j+1);$$

$$\text{for } 1 \leq i \leq L,\ i \leq j \leq L \text{ and } h(n) = O \text{ for } n < 1$$

where:

m=1, 2, . . . L; and h(n) is the impulse response of a transfer function H varying in time with parameters representative of spectral characteristics of said sound signal and taking into account long term prediction parameters characterizing a periodicity of said sound signal.

2. A method as defined in claim 1, wherein the step of calculating the target ratio $$(DA_k^T/\alpha_k)^2$$

comprises:

calculating in N successive embedded computation loops contributions of the non-zero pulses of the algebraic codeword $A_k$ to the denominator of the target ratio; and in each of said N successive embedded computation loops adding the calculated contributions to contributions previously calculated.

3. A method as defined in claim 2, wherein said adding step comprises adding the contributions of the non-zero pulses of the algebraic codeword $A_k$ to the denominator of the target ratio calculated in the embedded computation loops by means of the following equation:

$$\alpha_k^2 = \sum_{i=1}^{N} S^2(i)U(p_i,p_i) + 2\sum_{i=1}^{N-1}\sum_{j=i+1}^{N} SS(i,j)U(p_i,p_j),$$

in which SS(i,j)=S(i)S(j), said equation being developed as follows:

$$\begin{aligned}\alpha_k^2 = {} & S^2(1)U(p_1,p_1) + \\ & S^2(2)U(p_2,p_2) + 2SS(1,2)U(p_1,p_2) + \\ & \ldots \\ & S^2(N)U(p_N,P_N) + 2SS(1,N)U(p_1,p_N) + \ldots + \\ & 2SS(N-1,N)U(P_{N-1},P_N)\end{aligned}$$

where the successive lines represent contributions to the denominator of the target ratio calculated in the successive embedded computation loops, respectively.

4. A method as defined in claim 3, in which said N successive embedded computation loops comprise an outermost loop and an innermost loop, and in which said contribution calculating step comprises calculating the contributions of the non-zero pulses of the algebraic codeword $A_k$ to the denominator of the target ratio from the outermost loop to the innermost loop.

5. A method as defined in claim 3, further comprising the step of calculating and pre-storing the terms $S^2(i)$ and SS(i,j)=S(i)S(j) prior to said step (a) for increasing calculation speed.

6. A method as defined in claim 1, further comprising the step of interleaving N single-pulse permutation codes to form said sparse algebraic code.

7. A method as defined in claim 1, wherein the impulse response h(n) of the transfer function H accounts for $$H(z)=F(z)/(1-B(z))A(z\gamma^{-1})$$

where F(z) is a first transfer function varying in time with parameters representative of spectral characteristics of said sound signal, 1/(1−B(z)) is a second transfer function taking into account long term prediction parameters characterizing a periodicity of said sound signal, and $A(z\gamma^{-1})$ is a third transfer function varying in time with said parameters representative of spectral characteristics of said sound signal.

8. A method as defined in claim 7, wherein said first transfer function F(z) is of the form $$F(z)=\frac{A(z\gamma_1^{-1})}{A(z\gamma_2^{-1})}$$

where $\gamma_1^{-1}=0.7$ and $\gamma_2^{-1}=0.85$.

9. A method as defined in claim 1, further comprising the following steps for producing the backward-filtered version D of the L-sample block of said sound signal:

whitening the L-sample block of said sound signal with a whitening filter to generate a residual signal R;

computing a target signal X by processing with a perceptual filter a difference between said residual signal R and a long-term prediction component E of previously generated segments of a signal excitation to be used by a sound signal synthesis means to synthesize said sound signal; and backward filtering the target signal X with a backward filter to produce said backward-filtered version D of the L-sample block of said sound signal.

10. A system for calculating an index k for encoding a sound signal according to a Code-Excited Linear Prediction technique using a sparse algebraic code to generate an algebraic codeword in the form of an L-sample long waveform comprising a small number N of non-zero pulses each of which is assignable to different positions in the waveform to thereby enable composition of several algebraic codewords $A_k$, said index calculating system comprising:

(a) means for calculating a target ratio $$(DA_k^T/\alpha_k)^2$$

for each algebraic codeword among a plurality of said algebraic codewords $A_k$;

(b) means for determining the largest ratio among said calculated target ratios; and (c) means for extracting the index k corresponding to the largest calculated target ratio;

wherein, because of the algebraic-code sparsity, the computation carried out by said means for calculating a target ratio is reduced to the sum of only N and N(N+1)/2 terms for the numerator and denominator, respectively, namely $$DA_k^T=\sum_{i=1}^{N} S(i)D(p_i)$$

$$\alpha_k^2=\sum_{i=1}^{N} S^2(i)U(p_i,p_i)+2\sum_{i=1}^{N-1}\sum_{j=i+1}^{N} S(i)S(j)U(p_i,p_j)$$

where:

i=1, 2, . . . N;

S(i) is the amplitude of the $i^{th}$ non-zero pulse of the algebraic codeword $A_k$;

D is a backward-filtered version of an L-sample block of said sound signal;

$p_i$ is the position of the $i^{th}$ non-zero pulse of the algebraic codeword $A_k$;

$p_j$ is the position of the $j^{th}$ non-zero pulse of the algebraic codeword $A_k$; and U is a Toeplitz matrix of autocorrelation terms defined by the following equation, $$U(i,j)=\sum_{m=1}^{L} h(m-i+1)h(m-j+1);$$

$$\text{for } 1\le i\le L,\ i\le j\le L \text{ and } h(n)=0 \text{ for } n<1$$

where:

m=1, 2, . . . L h(n) is the impulse response of a transfer function H varying in time with parameters representative of spectral characteristics of said sound signal and taking into account long term prediction parameters characterizing a periodicity of said sound signal.

11. A system as defined in claim 10, wherein said means for calculating the target ratio $$(DA_k^T/\alpha_k)^2$$

comprises N successive embedded computation loops for calculating contributions of the non-zero pulses of the algebraic codeword $A_k$ to the denominator of the target ratio, each of said N successive embedded computation loops comprising means for adding the calculated contributions to contributions previously calculated.

12. A system as defined in claim 11, wherein each of said N successive embedded computation loops comprises means for adding the contributions of the non-zero pulses of the algebraic codeword $A_k$ to the denominator of the target ratio by means of the following equation:

$$\alpha_k^2=\sum_{i=1}^{N} S^2(i)U(p_i,p_i)+2\sum_{i=1}^{N-1}\sum_{j=i+1}^{N} SS(i,j)U(p_i,p_j),$$

in which SS(i,j)=S(i)S(j), said equation being developed as follows:

$$\begin{aligned}\alpha_k^2 = {} & S^2(1)U(p_1,p_1)+\\ & S^2(2)U(p_2,p_2)+2SS(1,2)U(p_1,p_2)+\\ & \ldots\\ & S^2(N)U(p_N,P_N)+2SS(1,N)U(p_1,p_N)+\ldots+\\ & 2SS(N-1,N)U(P_{N-1},P_N)\end{aligned}$$

where the successive lines represent contributions to the denominator of the target ratio calculated in the successive embedded computation loops, respectively.

13. A system as defined in claim 12, in which said N successive embedded computation loops comprise an outermost loop, an innermost loop, and means for calculating the contributions of the non-zero pulses of the algebraic codeword $A_k$ to the denominator of the target ratio from the outermost loop to the innermost loop.

14. A system as defined in claim 12, further comprising means for calculating and pre-storing the terms $S^2(i)$ and SS(i,j)=S(i)S(j) for prior to the target ratio calculation for increasing calculation speed.

15. A system as defined in claim 10, wherein said sparse algebraic code consists of a number N of interleaved single-pulse permutation codes.

16. A system as defined in claim 10, wherein the impulse response h(n) of the transfer function H accounts for $$H(z)=F(z)/(1-B(z))A(z\gamma^{-1})$$

where F(z) is a first transfer function varying in time with parameters representative of spectral characteristics of said sound signal, 1/(1−B(z)) is a second transfer function taking into account long term prediction parameters characterizing a periodicity of said sound signal, and $A(z\gamma^{-1})$ is a third transfer function varying in time with said parameters representative of spectral characteristics of said sound signal.

17. A system as defined in claim 16, wherein said first transfer function F(z) is of the form $$F(z)=\frac{A(z\gamma_1^{-1})}{A(z\gamma_2^{-1})}$$

where $\gamma_1^{-1}$=0.7 and $\gamma_2^{-1}$=0.85.

18. A system as defined in claim 10, further comprising:

a whitening filter for whitening the L-sample block of said sound signal with a whitening filter to generate a residual signal R;

a perceptual filter for computing a target signal X by processing a difference between said residual signal R and a long-term prediction component E of previously generated segments of a signal excitation to be used by a sound signal synthesis means to synthesize said sound signal; and a backward filter for backward filtering the target signal X to produce said backward-filtered version D of the L-sample block of said sound signal.

* * * * *